United States Patent [19]

Pinfold

[11] 4,139,758

[45] Feb. 13, 1979

[54] METHOD OF ARC WELDING UNDER WATER

[76] Inventor: Brian E. Pinfold, 34 Sudeley Walk, Putnoe, Bedford, England

[21] Appl. No.: 758,867

[22] Filed: Jan. 12, 1977

[30] Foreign Application Priority Data

Jan. 12, 1976 [GB] United Kingdom ............... 1078/76
Dec. 23, 1976 [GB] United Kingdom ............. 53715/76

[51] Int. Cl.² .............................................. B23K 9/16
[52] U.S. Cl. ........................................ 219/74; 219/72; 219/137 WM; 219/146.24
[58] Field of Search ................. 61/69 R; 219/72, 74, 219/75, 137 WM, 146, 146.24

[56] References Cited

U.S. PATENT DOCUMENTS

| | | | |
|---|---|---|---|
| 2,281,070 | 4/1942 | Jennings | 219/137 WM |
| 3,527,916 | 9/1970 | Ebert et al. | 219/74 |
| 3,566,073 | 2/1971 | Black | 219/146 |
| 3,670,135 | 6/1972 | Zvanut | 219/137 WM |
| 3,837,171 | 9/1974 | Scurlock | 61/69 R |
| 3,876,852 | 4/1975 | Topham | 219/72 |

Primary Examiner—E. A. Goldberg
Attorney, Agent, or Firm—Dennison, Dennison, Meserole & Pollack

[57] ABSTRACT

In a method of arc welding under water or at superatmospheric pressure (or both) the weld is made in a chamber containing a gaseous atmosphere. The weld metal is deposited from flux-cored welding wire whose core contains strong deoxidant(s) such as aluminium, magnesium, titanium, zirconium, lithium and calcium. A shielding gas containing a selected proportion of oxygen or oxygen-containing gas but consisting mainly of an inert gas such as argon or helium is employed to surround the arc. The shielding gas is constituted by the atmosphere in the chamber.

1 Claim, 1 Drawing Figure

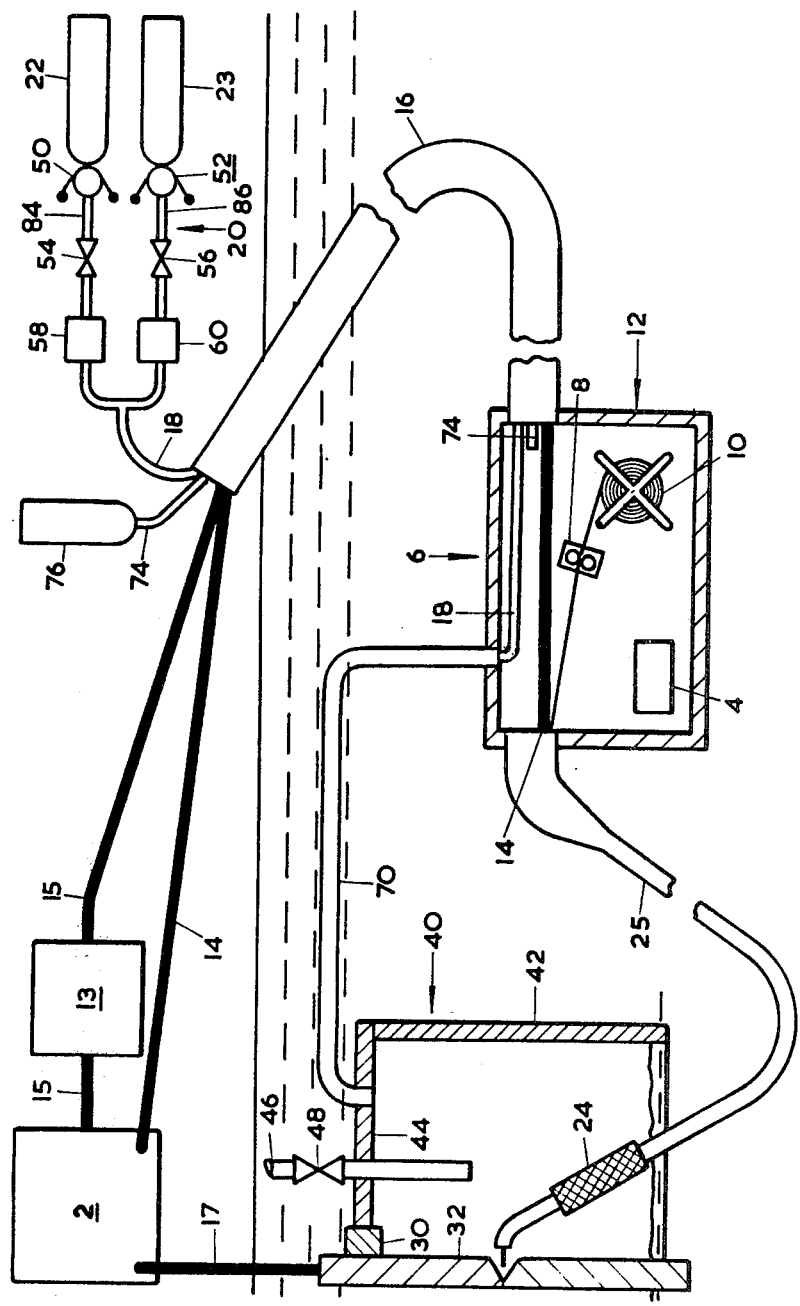

METHOD OF ARC WELDING UNDER WATER

BACKGROUND OF THE INVENTION (a) Field of the Disclosure

This invention relates to a method of arc welding in a chamber in which there is a gaseous environment. The method is particularly intended for operation under water and at superatmospheric pressure.

(b) Description of the Prior Art

With the growth of the offshore industry it has become essential to be able to make welds under water to a standard that satisfies certain nationally and internationally recognised welding codes. Attempts have been made to weld underwater without taking any steps to protect the welding arc from water. These have been unsuccessful, partly because water entering the arc becomes dissociated and the hydrogen thus formed is dissolved in the weld pool. The rapid quenching effect of the water on the weldments creates hard martensitic structures in the heat affected zone (HAZ) which are susceptible to hydrogen induced cracking, owing to hydrogen diffusion into the heat affected zone, particularly in joints subject to restraint.

It has been proposed to prevent water entering the arc by using a welding torch with a nozzle which is adapted to form a protective annular curtain of water spaced apart from the welding arc. With this piece of equipment it has been proposed to use a semi-automatic welding method with a consumable welding wire and a shielding gas including a large proportion of argon or carbon dioxide. This method is described inter alia in the *Journal of the Japan Welding Society*, 1974, pp 23 to 30, and pp 141 to 146.

However, when it is required to vary the angle of the welding torch in relation to the work, (ie in "out-of-position" welding) as in manually operated GMA welding, the water curtain shielding cannot be fully maintained to prevent relatively large quantities of water from entering the arc and the resultant turbulence seriously impairs the welder's visibility. Even when a constant angle is maintained so as to preserve the water curtain (eg in automatic straight line welding) fume emitted by the consumable welding wire will tend to be confined to the region of the arc by the water curtain thereby also seriously impairing the welder's visibility of the arc.

Alternatively it has been proposed to use 'in the wet' a flux-cored wire or a solid wire with a shielding gas under water, without any water curtain. The use of solid wire with a shielding gas is the conventional, so-called GMA welding process. Such proposals have been made in a number of papers, for example, by M L Levin in Marine Technology, Vol. 4, No. 3 June 1973. pp 73 to 77, and by I. M. Savitch in the proceedings, International Conference, Welding in Offshore Constructions, 26 to 28 February 1974, paper no. 20, pp 217 to 220. In the latter case no western investigator has been able to repeat the claimed results. Satisfactory welds may be achieved under water using semi-automatic GMAW by forming under water a fixed chamber, displacing water from the chamber by passing gas into it, and then welding by means of the conventional GMA process in the short-circuiting mode which employs a solid wire. Such a process is described in U.S. Pat. No. 3,876,852 (Topham). M. L. Levin in 'Welding in the Sea', Marine Technology, Vol. 4 No. 3 June 1973 pp 73-77 also refers to using a semi-automatic MIG welding process in a gas filled chamber under water in order to make 'top quality' welds. He specifically states that the welding electrode should not have any flux. P. L. J. Leder and F. W. Lunau in a paper entitled 'High duty welding' published in the Australian Welding Journal 18, No. 5 pp. 149-159, September-October 1974 also refers to GMA welding under water, this time in a small hand-held gas-filled chamber having transparent walls.

We have surprisingly found that despite the aforementioned publications to use underwater a semi-automatic GMA (ie solid wire) arc welding process in a chamber containing gas this process often fails to produce sound welds, there often being lack of fusion between the weld metal and the parent metals ie the weld metal solidifies before adequate fusion with the parent metal has taken place.

OBJECTS OF THE INVENTION

It is an object of the invention to provide a method of welding under water or at superatmospheric pressure (or both) which makes possible the deposition of weld metal having sound mechanical and metallurgical properties from a consumable welding wire.

It is a further object of the invention to provide a method of welding under water or at superatmospheric pressure (or both) which makes possible the attainment of adequate fusion between the weld metal and the parent metal.

DESCRIPTION OF THE INVENTION

According to the present invention there is provided a method of arc welding in a chamber containing a gaseous environment, including the steps of forming the gaseous environment in the chamber by passing into the chamber at least one inert gas selected from the group consisting of argon, krypton, xenon and helium and at least one oxygen-containing gas selected from the group consisting of oxygen and carbon dioxide, and depositing weld metal from a consumable, flux-cored arc-welding wire containing at least one strong deoxidiser selected from the group consisting of magnesium, aluminium, zirconium, titanium, barium, lithium and calcium, the proportion of oxygen (if any) in the gaseous environment having a partial pressure less than the partial pressure of oxygen in air and constituting less than 14% by volume of the gaseous environment.

The invention also provides a method of arc welding under water including the steps of supplying gas to a fixed welding chamber, located under water, so as to create a gaseous environment about the region where weld metal is to be deposited, and feeding a continuous consumable arc-welding wire to the region where weld metal is to be deposited, the wire comprising a tubular sheath containing a core including at least one strong deoxidant selected from the group consisting of aluminium, magnesium, calcium, barium, lithium, zirconium and titanium.

The term "strong deoxidiser" is used herein to indicate a metal whose reaction with oxygen is considerably more exothermic than that between iron and oxygen. For the avoidance of doubt, manganese and silicon although used extensively in welding electrodes as deoxidisers are not classified herein as "strong-deoxidisers". The following metals are classified herein as strong deoxidisers: magnesium, aluminium, zirconium, titanium, barium and lithium.

Metals such as clacium are, theoretically speaking, suitable for use as "strong deoxidisers" but tend to react so readily and so violently with oxygen or moisture that the difficulties in storing them, handling them, and manufacturing an electrode incorporating them, renders their use as "strong deoxidisers" either hazardous or inconvenient or both. For some metals, for example calcium, it has been alleged that some of the difficulties mentioned in the preceding sentence may be reduced by forming an alloy of the metal with, typically, iron.

Preferred strong deoxidisers are aluminium and magnesium.

Flux-cored welding wires containing strong deoxidisers are commercially available and may be used in the method according to the present invention. It is notable that such welding wires containing strong deoxidisers are we believe, examples of the class of welding electrodes termed "self-shielding" or "in-air" welding electrodes. Although it has been proposed to use "strong deoxidisers" in flux-cored welding wires we believe that no such welding wire has hitherto been used with an externally supplied shielding gas. It may thus be said that the method according to the present invention makes use of welding wires of the 'self-shielding' or 'in-air' type with an externally-supplied shielding gas.

Preferred electrodes for use in conjunction with the method according to the present invention are sold under the registered trade mark "Innershield". Innershield 203M and Innershield 203 Ni electrodes are particularly suitable for use in the method according to the present invention. It is, however, entirely within the scope of the present invention to make up a flux-cored electrode especially for use in the method according to the present invention. Such an electrode could be unsuitable for arc welding without an external shielding gas at atmospheric pressure By the term "inert gas" as used herein is meant a gas which does not react chemically with any constituent of the welding wire and does not adversely affect the metallurgical properties of the weld metal. The preferred inert gas is argon. Helium may, however, be used as an inert gas in addition to, or instead of, argon. Also, one or more 'noble' gases such as krypton and xenon may if desired be used instead of or in addition to argon or helium.

Almost inevitably, unless a welding gun having its own built-in fume extractor is used, a relatively large quantity of fume will be emitted by the welding wire. It is desirable to remove this fume from the chamber so as to prevent the fume from observing the visibility of the welder/diver.

The method according to the present invention may be used when it is desired to weld under water. In the interior of the chamber there may be controls for adjusting the supply of gas thereto and for regulating the supply of electrical power to electrically-operated apparatus, such as lighting systems, therein. In such a chamber people may work without their own independent breathing apparatus. Typically, such a chamber will have removable base or removable side wall (or portion thereof) to permit access to be gained to its interior and to permit water to be displaced therefrom. The wall of such a chamber will typically be made of relatively thick steel which is well capable of withstanding the super-atmospheric pressures to which it is likely to be subjected in use. Such chambers suffer from the disadvantage of requiring complicated support equipment on the surface of the water.

It is preferred to use a form of chamber in which the welder relies on his own breathing equipment and supply of oxygen. Such a chamber is adapted to be fitted around the workpieces to be welded together, and preferably has an open base. Gas (typically argon) is then supplied to the chamber to displace water from, and to create a gaseous environment in, its interior. The chamber may be large enough for a welder-diver to work with his head and shoulders (or substantially his whole body) in the gaseous environment. On the other hand the chamber may merely be sufficiently large to enable a welder-diver to insert the welding gun into the gaseous environment. If the chamber is not sufficiently large for a welder-diver to work with his head within the gaseous enironment the chamber may have one or more walls of transparent material through which he can see what he is doing when he is welding.

An alternative (but one which is not preferred) is to use a portable chamber comprising a small cylinder in which a welding torch terminates. The cylinder is closed at one end, preferably by a transparent plate, and is open at the other. The open end preferably has attached to it a contoured flexible seal which is adapted to be pressed against the workpieces to be welded. The welding torch preferably enters the cylinder through a flexible gland at one side. When gas is passed into the cylinder water is displaced through the open end and gaseous environment is created within the cylinder. A welder-diver is able to manipulate the welding torch with one hand while holding the cylinder against the workpieces with the other, and to observe a weld being deposited through the transparent plate.

The method according to the present invention is also suitable for welding in a hyperbaric chamber on dry land or on the surface of the water.

The core of the electrode preferably contains substances capable of giving a viscous slag. Typically the electrode may contain calcium fluoride and a compound of strontium or barium eg strontium fluoride, barium fluoride. It is believed that these compounds, together with magnesium oxide and aluminium as strong deoxidisers, are capable of giving a viscous slag. By forming a viscous slag it is possible to weld out-of-position (eg in the horizontal vertical, or overhead positions) with a substantially greater heat input than with a solid wire GMA welding process.

It is also preferred that the core of the electrode contain a compound, such as lithium fluoride, or a lithium oxide which under the conditions of the arc releases a metal vapour. It is believed that such metal vapour tends to shield the arc and to reduce diffusion of gas from the gaseous environment into the weld metal being deposited.

It is believed that the Innershield 203 M and Ni electrodes include in their core magnesium, aluminium, barium fluoride and a compound of lithium.

The core of the electrode may also contain if desired, metal oxides such as iron oxide. These react exothermically with strong deoxidizers such as aluminium and magnesium supplying extra heat to the weld pool. This results in fusion characteristics superior to those associated with those conventional welding processes in which a solid or flux-cored wire is used with an externally supplied shielding gas.

In addition, the core of the electrode may also contain alloying metal powder such as nickel.

If the welding wire has been formulated for use at atmospheric pressure without a shielding gas, the proportion of strong deoxidants will have been selected with the aim of avoiding two causes of weakness in the weld metal deposited by the wire. One cause of such weakness is insufficient strong deoxidant. When the level of strong deoxidant is insufficient oxygen and nitrogen will enter and become chemically combined with the weld metal. The other cause of such weakness is excessive strong deoxidant. When the level of strong deoxidant is excessive not all of it will be consumed in reacting with oxygen and nitrogen to form slag. Some will thus enter the weld metal. It has been found that the presence of excessive strong deoxidant or excessive oxygen in the weld metal can be deleterious. Formulators of 'self shielding' electrodes for use at atmospheric pressure thus try to select the proportion of strong deoxidant such that when welding it is substantially all consumed.

The method according to the present invention will now be described by way of example with reference to the accompanying drawing which is a schematic view of one form of apparatus suitable for performing the methods according to the present invention.

Referring to the drawing, a DC power source 2 located above water is connected in electrical circuit with the contact tip of a welding torch 24 via a lead 14 which passes under water through an umbilical tube 16. The welding circuit is completed by a lead 17 which is connected between the power source 2 and a workpiece 32 to be welded. A conventional submersible wire feed unit 6 shown schematically in FIG. 1, contains a drive motor 4, a traction element 8 and a wire sppol 10. These components together with the motor are located in a water-tight casing 12. The motor 4 is connected to the power source 2 by means of lead 15 which is received by the umbilical tube 16 via suitable control circuits 13. For convenience, the electrical connections between the lead 15 and the motor 4 are not illustrated. However, suitable wiring arrangements are well known in the art. Alternatively the drive motor 4 may have its own independent power supply. The umbilical tube 16 also receives a flexible gas conduit 18 connected at one end to a gas mixer 20 which is located above water, and a flexible gas conduit 74 which is connected to an above-water source 76 of compressed gas (eg argon). The umbilical tube 16 protects the leads and conduits therein as these leads and conduits pass into the submersible wire feed unit. The conduit 74 terminates in the casing 12 a gas pressure just greater than the surrounding hydrostatic pressure, venting of gas being effected through a suitable demand valve (not shown) which is set so as to prevent the pressure in the casing 12 becoming excessive. From the wire feed unit 6 a continuation 25 of the umbilical tube 16 protects welding wire from the spool 10 a continuation of lead 14 and the shielding gas conduit 18 as they pass to the welding torch 24 which a welder-diver is able to insert into a welding chamber 40. The conduit 18 terminates short of the torch 24, the gas being supplied to the nozzle of the torch, the arrangement being that shielding gas therefrom issues from the nozzle of the torch, in an annular stream around the consumable welding wire.

The welding chamber 40 has a wall 42 which is of transparent material. The upper wall 44 of the chamber has a contoured flexible seal 30 attached to it.

While the bottom of the chamber is open to the sea. A flexible conduit 70 is joined to the conduit 18 and continues from the casing 12 and enters the chamber 40 through the upper wall 44 thereof so as to conduct into the chamber gas from the mixer 20.

The gas mixer 20 has two conduits 84 and 86 which are both joined to the shielding gas conduit 18. The other ends of the conduits 84 and 86 terminate in a source 22 of oxygen gas and a source 23 of argon gas respectively. The sources 22 and 23 are conveniently cylinders of compressed gas. Associated with the gas sources 22 and 23 are pressure regulators 50 and 52 respectively. By observing the flow rate of gas through the flow meters 58 and 60 the valves 54 and 56 may be present to give any desired mixture of oxygen and argon.

Alternatively a cylinder containing a mixture of argon and oxygen in chosen proportions may be used instead of the gas mixer.

In operation, the chamber 40 is held against the workpiece 32 by its shape, eg annular, or by holding devices such as clamps, and the workpiece is connected directly to the power source 2. The wire feed unit 6 is positioned under water as close as possible to the region where the weld metal is to be deposited. The power source 2 itself, together with the sources of gas and the mixer 20 and also the control unit 13 for controlling welding parameters are located above the surface of the water. The power supply 2 and the wire feed unit 12 are energised and the supply of gases from sources 22 and 23 and argon from the source 76 is commenced when the welder-diver is ready. The argon passing into the chamber 40 displaces sea water from within the chamber through the bottom thereof. The welder-diver inserts his torch 24 into the localised 'dry' or gaseous environment thus provided. The gas mixture from the mixer 20 provides for the welding wire (preferably "Innershield" welding wire) (Innershield is a Registered Trade Mark) a shielding gas containing a controllable proportion of oxygen.

An arc is struck between the tip of the consumable welding wire and the workpiece, and molten metal is transferred from the electrode to the workpiece in the globular mode.

The chamber 40 preferably has a conduit 46 extending from within the chamber 40 through the wall 42 and terminating above the wall 42. In the region outside the chamber 40 the conduit 46 has a manually-operable control valve 48 which may be set to give a steady flow of gas out of the chamber 40. The gas may be supplied to the chamber 40 at a corresponding rate throughout a welding operation. This provides for a continuous flow of gas through the chamber to expel the fume evolved when welding.

It is desirable that the gaseous environment in the chamber should contain less oxygen than would create a fire or explosion hazard at the prevailing pressure.

In general, the maximum concentration of oxygen tolerable in the gaseous environment is 14% by volume of oxygen, but at relatively high pressures this concentration will be reduced.

I claim:

1. A method of arc welding in an underwater chamber containing a gaseous environment, including the steps of forming the gaseous environment at superatmospheric pressure in the chamber by passing into the chamber at least one inert gas selected from the group consisting of argon, krypton, xenon and helium and at least one oxygen-containing gas selected from the group consisting of oxygen and carbon dioxide, depositing weld metal from a consumable, flux-cored arc welding wire containing at least one strong deoxidiser selected from the group consisting of magnesium, aluminum, zirconium, titanium, barium, lithium and calcium, the proportion of oxygen in said oxygen-containing gas in the gaseous environment having a partial pressure less than the partial pressure of oxygen in air at atmospheric pressure and constituting less than 14% by volume of the gaseous environment and extracting the fume emitted by the welding from said gaseous environment.

* * * * *